(12) United States Patent
Coin et al.

(10) Patent No.: US 9,772,616 B2
(45) Date of Patent: Sep. 26, 2017

(54) METHOD FOR CONTROLLING A DRILLING ROBOT, AND DRILLING ROBOT IMPLEMENTING SAID METHOD

(71) Applicant: AIRCELLE, Gonfreville l'Orcher (FR)

(72) Inventors: Maxime Coin, Boulleville (FR); Denis Ramage, Heuqueville (FR)

(73) Assignee: AIRCELLE, Gonfreville l'Orcher (FR)

( * ) Notice: Subject to any disclaimer, the term of this patent is extended or adjusted under 35 U.S.C. 154(b) by 283 days.

(21) Appl. No.: 14/732,025

(22) Filed: Jun. 5, 2015

(65) Prior Publication Data
US 2015/0268651 A1   Sep. 24, 2015

Related U.S. Application Data

(63) Continuation of application No. PCT/FR2013/052988, filed on Dec. 6, 2013.

(30) Foreign Application Priority Data
Dec. 7, 2012 (FR) ..................................... 12 61766

(51) Int. Cl.
*G05B 19/048* (2006.01)
*G05B 19/416* (2006.01)

(52) U.S. Cl.
CPC ......... *G05B 19/048* (2013.01); *G05B 19/416* (2013.01); *G05B 2219/37388* (2013.01); *G05B 2219/39444* (2013.01); *G05B 2219/45059* (2013.01); *Y10S 901/41* (2013.01)

(58) Field of Classification Search
CPC .......... Y10T 408/97; E21C 11/00; E21B 7/06; E21B 17/08; E21B 17/1078; G05B 19/048; G05B 19/416
See application file for complete search history.

(56) References Cited

U.S. PATENT DOCUMENTS 3,951,216 A * 4/1976 Crawshay ............. E21B 19/086
173/156
4,241,796 A * 12/1980 Green ....................... E21B 7/06
175/24
4,458,766 A * 7/1984 Siegel ....................... E21B 7/18
175/25
(Continued)

FOREIGN PATENT DOCUMENTS

FR    CA 2889917 A1 *  6/2014 ........... G05B 19/416
FR    WO 2014087115 A1 *  6/2014 ........... G05B 19/416
IL    WO 9743981 A1 * 11/1997 ........... A61B 17/176

OTHER PUBLICATIONS

International Search Report issued Apr. 16, 2014 in International Application No. PCT/FR2013/052988.

*Primary Examiner* — Crystal J Barnes-Bullock
(74) *Attorney, Agent, or Firm* — Burris Law, PLLC

(57) ABSTRACT

The present disclosure relates to a drilling robot and a method for controlling a drilling robot including a driven mechanical structure allowing to place a drilling tool in a sequence of drillings programmed in terms of position and orientation of the drilling of a part such as a technical skin. The method includes a step of determining the acceleration of the drilling tool at the end of the approach on a drilling position, then also testing a stabilization condition of the drilling tool to finally establish a drilling authorization.

11 Claims, 3 Drawing Sheets

(56) References Cited

U.S. PATENT DOCUMENTS

| | | | | |
|---|---|---|---|---|
| 5,265,684 | A * | 11/1993 | Rosenhauch | E21B 17/1014 175/325.2 |
| 5,766,179 | A * | 6/1998 | Faccioli | A61B 17/1725 606/96 |
| 6,039,514 | A * | 3/2000 | O'Donovan | B23B 39/167 408/1 R |
| 6,092,610 | A * | 7/2000 | Kosmala | E21B 4/20 175/27 |
| 6,109,372 | A * | 8/2000 | Dorel | E21B 7/06 175/269 |
| 7,334,650 | B2 * | 2/2008 | Giroux | B05B 1/00 166/380 |
| 7,392,861 | B2 * | 7/2008 | Fouillou | E21B 47/01 175/325.1 |
| 8,286,729 | B2 * | 10/2012 | Reckmann | E21B 7/062 175/40 |
| 2006/0116786 | A1 | 6/2006 | Iwashita et al. | |

* cited by examiner

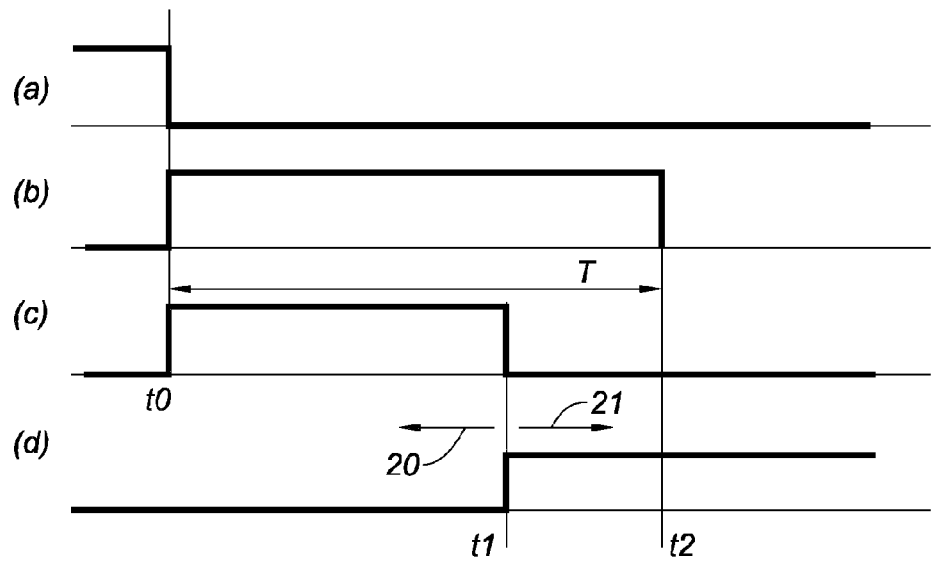
Fig. 3
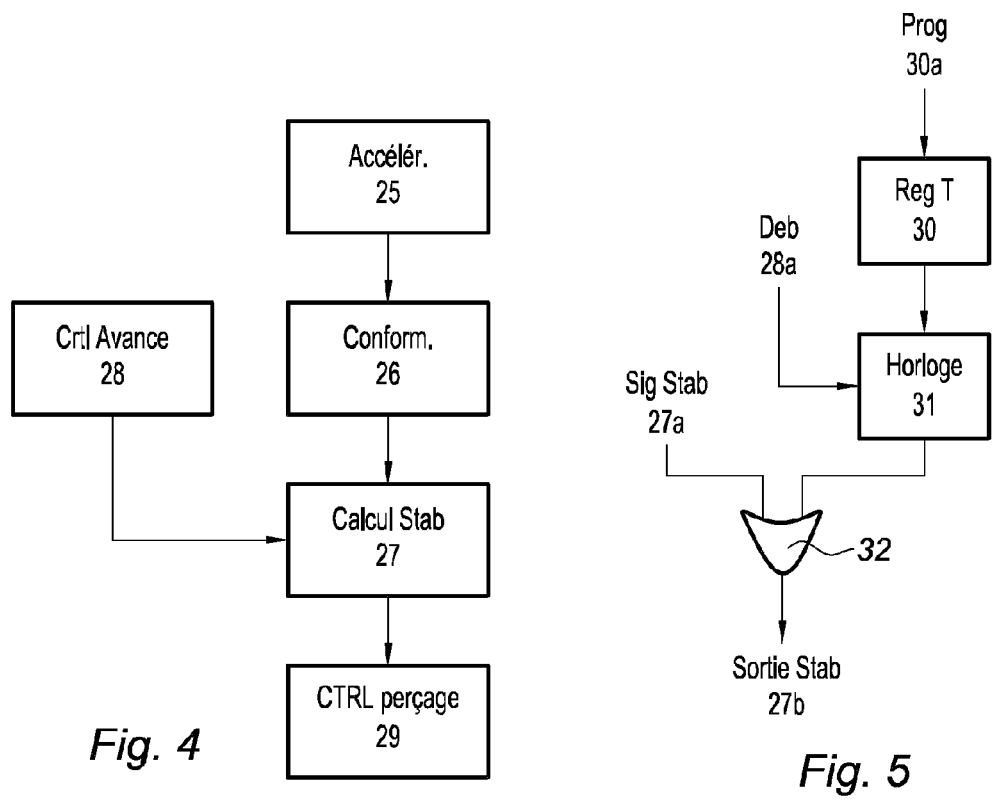
Fig. 4
Fig. 5

METHOD FOR CONTROLLING A DRILLING ROBOT, AND DRILLING ROBOT IMPLEMENTING SAID METHOD

CROSS-REFERENCE TO RELATED APPLICATIONS

This application is a continuation of International Application No. PCT/FR2013/052988, filed on Dec. 6, 2013, which claims the benefit of FR 12/61766, filed on Dec. 7, 2012. The disclosures of the above applications are incorporated herein by reference.

FIELD

The present disclosure relates to a method for controlling a drilling robot. It also relates to a drilling robot to implement the method.

BACKGROUND

The statements in this section merely provide background information related to the present disclosure and may not constitute prior art.

In the state of the art, drilling robots which allow in particular to realize drilling series using drills, are already programmed. The drilling tool is mounted at the end of an articulated arm, for example with six degrees of freedom. Each axis is equipped with an actuator which allows to move the end of the arm in a determined position and orientation. The result is that the drilling tool can be approached according to a determined orientation in each programmed position of a sequence of drillings executed according to a determined program.

Thus, in response to the drilling program which is registered and executed on the controlling device of the driller robot, the drilling tool secured to the end of the robot arm undergoes a positive acceleration, then a negative acceleration (braking) during the approach of the following drilling position. When the drilling tool is finally stopped, an unsteady state may be established, the tool starting to oscillate around the reached drilling position. This instability depends on various factors comprising the approach acceleration, the inertia of the robot arm and others.

If the drilling was controlled upon detection of the end stop, the drilling would be entirely defective, with a non-cylindrical form and an ovalized section.

To overcome this drawback, it is known to count an inhibition period of the drilling to be counted from the stop detection on a drilling position so as to guarantee that the inertias and other braking forces of the unstable oscillations have absorbed the instability. The longest natural stabilization period provided in all programmed movements is chosen to realize the drilling program.

In an exemplary form, the drilling inhibition period was established at 2.5 sec.

But it was found that for all programmed positions, if no stabilization period is not longer by definition, an important number of stabilization periods were shorter than the retained inhibition duration. There is therefore a waste of time during the execution of the drilling program.

Furthermore, it was found that, during the drilling execution, because of many parameters, comprising the material irregularity of the part to be drilled, balancing or wear defects of the perforating drill and others, an unsteady state could still appear on the drilling tool. Among the drawbacks of these instabilities, the ovalization and the delamination problem(s) can be cited.

SUMMARY

The present disclosure reduces the duration of the complete execution of the drilling program by controlling the stability of the drilling tool so as to reduce to the strictly necessary the inhibition period before each drilling. The present disclosure also reduces the negative effects of instability at the stop of the drilling tool.

The present disclosure relates to a method for controlling a drilling robot. The drilling robot is of the type including a driven mechanical structure allowing to place a drilling tool in a drilling sequence programmed in terms of position and orientation of the drilling of a part such as a technical skin.

The present disclosure is characterized in that the method includes a step of determining the acceleration of the drilling tool at the end of the approach on a drilling position. When a stabilization condition of the drilling tool is established, a drilling authorization is generated.

According to other features, the present disclosure relates also to:

The logical condition of stabilization comprises the consideration of the instantaneous measurements of at least one component of the acceleration vector;

The test of the logical condition of stabilization includes the comparison of at least one value of the instantaneous measurements of at least one component of the acceleration vector at a predetermined threshold value;

The test of a stabilization condition of the drilling tool is combined with the progress of a pre-programmed period;

the step of determining the acceleration of the drilling tool at the end of the approach on a drilling position is continued after the drilling authorization so as to realize an analysis of the measurement data of the accelerometer, then to exploit the analysis data in real time in order to trigger on the drilling robot and/or on the drilling tool a corrective action such as a drilling cycle stop, or offline by realizing a measurement data file of the measured acceleration associated with each drilling position so as to provide traceability means of the drilling operation with reference to each programmed drilling position. One of the accelerometer measured components is established according to the axis of the perforating drill and in that the measurement of the components according to the two other components of the acceleration vector are tested in a logical condition of drilling quality to detect an ovalization of the programmed drilling.

The logical condition of the drilling quality comprises the comparison of components of the measured acceleration to a limit acceleration table.

The present disclosure also relates to a drilling robot implementing the drilling controlling method of the present disclosure. It includes an accelerometer secured to the end of a mobilization structure of a drilling tool, the accelerometer being connected to measurement, monitoring and testing means of a logical condition of stabilization on a sequence of drilling positions preprogrammed in a memory associated with a control calculator of the drilling robot.

According to other features:

the accelerometer is secured to the end of a mobilization structure of a drilling tool so that a measured acceleration component is aligned with the axis of a perforating drill;

The drilling robot includes a means for registering the drilling quality data, produced on the basis of the comparison of measurement data of the accelerometer at a table of comparison values, in a drilling traceability file in association with the drilling position.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a timing diagram of signals generated during the controlling method in another form of the present disclosure;

FIG. 4 is a block diagram of a controlling device of a driller robot of one form of the present disclosure;

FIG. 5 is a block diagram of a variant of a portion of the controlling device of a driller robot of the form of FIG. 4;

Figure 1:
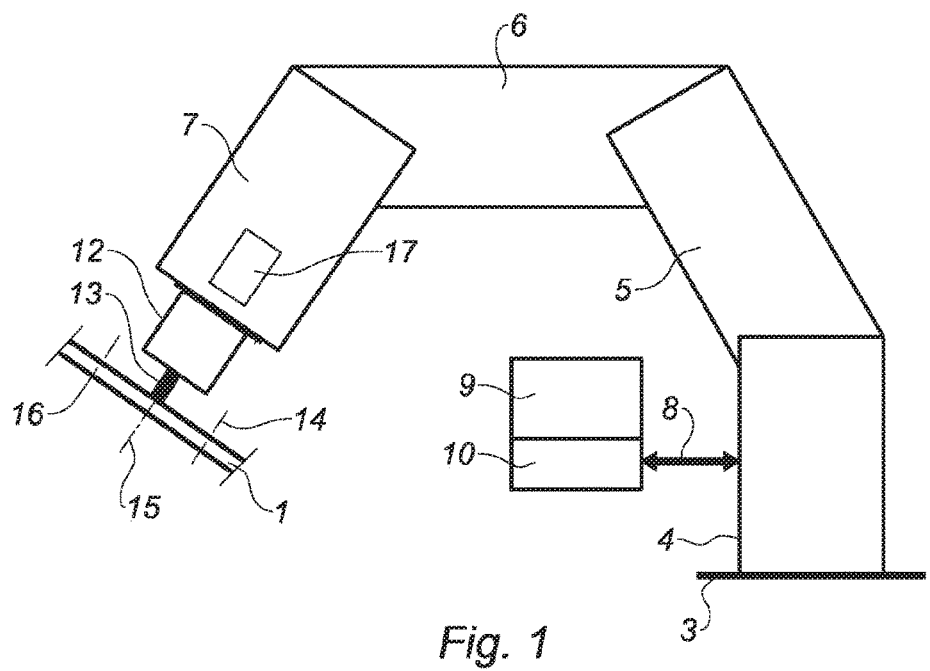
FIG. 1 is a diagram of a drilling robot adapted to implement the method of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 represents a drilling robot which includes a mobile structure, one end 7 of which carries a drilling tool 12 on which a perforating drill 13 is mounted. The drilling head 12 may also carry more perforating drills 13. Preferably, the mobile structure is composed of many articulated arms 4-7 one end of which is fixed in 3.

The movements of the articulated arm end 4-7 are executed using actuators controlled by a computer 10 connected to the robot itself by a link 8. The computer 10 executes a drilling program pre-established and registered in a memory of programs 9 associated with the calculator 10. The drilling program allows to move the drilling tool on a determined series of drilling points or positions 14-16 on a part to be drilled 1, such as a technical skin.

Figure 2:
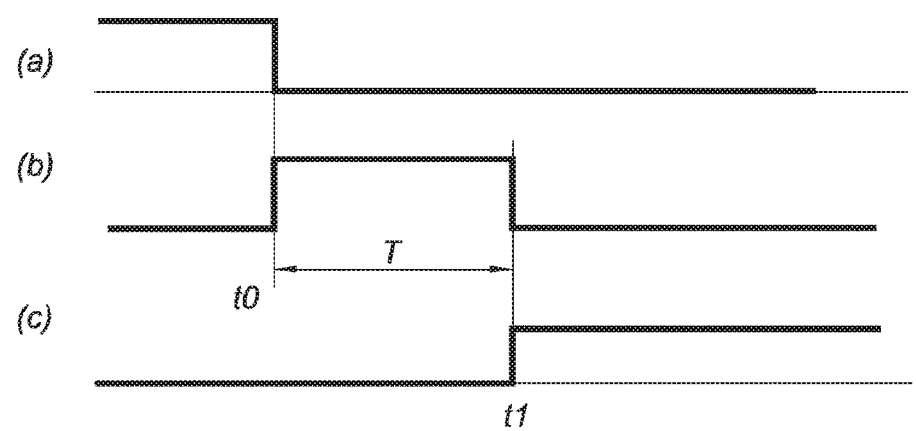
FIG. 2 is a timing diagram of signals generated during the controlling method in one form of the present disclosure.

In FIG. 2, a timing diagram of signals generated during the controlling method in an form of the present disclosure is represented. According to the method of the present disclosure, when the drilling program determines a stop (signal (a)—FIG. 2) of the end movement of the mobile structure 4-7 of the robot because a new drilling position has been reached, there is executed a step of determining the acceleration of the drilling tool at the end of the approach on a drilling position (signal (b)—FIG. 2) which takes a variable duration T counted from the stop date t0 of the robot. When a stability condition of the drilling tool is established (date t1), a drilling authorization is generated (signal (c)—FIG. 2).

In order to execute the step of determining the acceleration of the drilling tool at the end of the approach on a drilling position, an accelerometer 17 is disposed on the end 7 of the mobile structure 4-7 of the drilling robot. In one form, an accelerometer is used producing a three-dimensional measurement. In another form, one of the acceleration measurement directions is aligned with a reference direction of the drilling tool 12. The axis of the perforating drill 13 may be chosen.

During the detection step of a stability condition of the drilling tool on the drilling robot, a test of a predetermined logical condition CL is executed as a function of the measured values (Ax, Ay, Az) of the acceleration of the form:

$$CL(Ax, Ay, Az)$$

which takes the true or false value. In an exemplary form, the predetermined logical condition CL calculates at each instant t after the date t0 the largest absolute value of the three measurement signals (Ax, Ay, Az) according to the three measured directions of the reference trihedron of the space 3D of the accelerometer. Then it compares this value to a threshold value Sa. The predetermined logical condition CL is therefore of the form:

$$CL = (\max(|Ax|, |Ay|, |Az|) < Sa)$$

When the logical stabilization condition CL is not verified, the acceleration measurement is resumed and a new test of the stability condition CL is resumed on the basis of the new acceleration measurement.

It is noted that the accelerometer is in practice realized on the basis of a sensor, the acceleration sensitivity of which is maximum in a privileged direction and decreases more or less strongly when one deviates from this privileged direction. To improve the overall sensitivity of the accelerometer, to measure a component Ax, Ay or Az of the acceleration vector according to each of the three directions x, y, z of the reference trihedron of the space 3D, many sensors, each having a privileged direction of better sensitivity are associated in the accelerometer to produce each of the three components Ax Ay, Az of the acceleration vector with an improved sensitivity.

When the logical condition of stabilization CL is verified, the signal (b) (FIG. 2) falls at the time t1, after a variable duration T of stabilization of the mobile structure of the drilling robot. This signal (b) fall produces (signal (c)—FIG. 2) an activation of an authorization signal of the drilling operation, the perforating drill 13 of the drilling tool starts rotating and takes a forward movement along its rotation axis, executes the drilling in the programmed position on the part 1. This drilling axis defines an axis W constituting a 7th axis of the robot. We are therefore provided with enhanced stability of the drilling tool 12 and in a variable time T which is almost always inferior to the blocked stabilization period blindly applied in the state of the art. This results in a reduction of the complete duration of the drilling cycle and therefore an improvement of the productivity of the drilling robot.

In FIG. 3, a timing diagram executed in another form of the controlling method of the present disclosure is represented. The timing diagram of FIG. 3 differs from that of FIG. 2 in that a clock (signal (b)—FIG. 3), triggered at date t0 determined by the end of the approach movement executed by the mobile structure of the robot (signal (a)—

FIG. 3) places a determined period T allowing to interrupt the test of the logical condition CL of stabilization (signal (c)—FIG. 3) described in the form of FIG. 2.

Indeed, the stabilization condition of the end of the mobile structure which carries the drilling tool 12 (FIG. 1) is verified at a date t1 of authorization of the drilling operation (signal (d)—FIG. 3) which can be late (arrow 21) or early (arrow 20) according to the circumstances of the approach movement of the drilling tool 12. If the establishment of the stabilization condition CL takes a too long time T, determined by the clock (signal (b)—FIG. 3), the test of the logical stabilization condition of the end of the mobile structure of the drilling robot is interrupted and the activation signal of the drilling operation (signal (d)—FIG. 3) passes to the high state and the drilling begins.

Thus the waste of time caused by a detection condition of an acceleration superior to the threshold of the logical condition CL that would not be produced by a stabilization defect of the end of the mobile structure of the drilling robot.

In FIG. 4, in block diagram form, an implementation of the controlling method described using the FIG. 2 is represented. The blocks represented may be realized under various material realizations in the calculator 10 of the drilling robot, including electronic circuits or a micro-programmed microcontrollers programming.

An accelerometer 25 is mounted as the accelerometer 17 of the drilling robot 2-13 of FIG. 1. Its measurement signals are transmitted to a signal shaper 26 and the shaped measurement signals of the instantaneous acceleration are transmitted to a calculator 27 of a logical condition CL, defined above using FIG. 2.

The calculator 27 receives a signal, such as the signal (a), FIG. 2, or FIG. 3, of a circuit 28 for controlling the advance of the end of the drilling robot carrier of the drilling tool 12.

When the stabilization condition CL is verified by the stability calculator 27, a signal such as the signal (c) FIG. 2 of drilling authorization is transmitted to a drilling controlling circuit 29.

In FIG. 5, in a block diagram form, an implementation of the controlling method described using FIG. 4 is represented. The implementation of this second form resumes the blocks of the form but interposes the block of FIG. 5 between the blocks 27 and 28 of FIG. 4.

A register T 30 receives, by programming 30a, a limit value T of test of the stabilization condition CL tested in the block 27 of FIG. 4. The value T is transmitted to a first input of a clock or time counter 31, a second input 28a of which receives the detection signal of the end of the approach produced by the aforementioned advance controlling circuit 28 (signal (a)—FIG. 3). The counting of the duration T preprogrammed in the register T 30 is executed by the clock 31, the output of which (signal (b)—FIG. 3) falls to the end of the period T at t2.

The period signals T coming from the clock 31 and of logical condition CL of stabilization coming from the stabilization calculator 27 are provided at the inputs of a logical gate OR 32 which produces an output 27b of drilling authorization such as the signal (d) FIG. 3 at the activation input of the drilling controlling circuit 29 of FIG. 4.

In a third form of the controlling method of the present disclosure, the monitoring of the instantaneous measurement of the acceleration is continued during the drilling. The measurement data of the accelerometer are therefore analyzed in amplitude over time, by frequencies (transformed in Fourier) or still by time-frequency (transformed in wavelets). The result data of the analysis are therefore used in real time to trigger on the drilling robot and/or on the drilling tool a corrective action as a stop cycle of the drilling operation, or offline by realizing a measurement data file of the measured acceleration associated with each drilling position so as to provide traceability means of the drilling operation with reference to each programmed drilling position. The file is therefore registered at the control calculator 10 of the robot 2-13 for a subsequent exploitation in association with the drilled part 1, the drilling tool 12 and the drill 13, and the program 9 of the programmed drilling positions 14-16.

Figure 6:
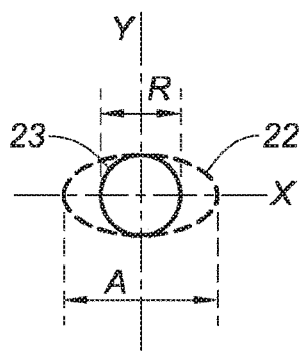
FIG. 6 is a diagram for explaining another form of the method of the present disclosure.

In FIG. 6, a case of application of this third form of the controlling method of the present disclosure is represented. A drilling 23 is schematically represented in a preprogrammed drilling position in a reference xyz associated with the perforating drill, the X and Y axes being oriented in the plane of the figure and the Z axis on the normal to this plane along the axis of the drill. The ideal drilling 23 in the correct stabilization condition is of a perfectly circular section. Correct stability data associated with the position of drilling 23 can therefore be registered in a drilling traceability file.

If the stabilization condition is not correct during the drilling, the drilling is ovalized in 22 according to the axis X, with a dimension A superior to the diameter R of the circular section of the ideal drilling 23. In this case, the acceleration measured along the axis X on the end of the mobile structure 4-7 of the drilling robot is not zero. These incorrect stability data are therefore registered in the drilling traceability file in association with the drilling position 23.

The drilling program can determine a maximum ovalization rate O as the NR ratio of real drilling 22 to programmed drilling 23 should be respected. By registering limit acceleration tables SBX, SBY, in the X and Y directions, and a test execution of a logical condition of the drilling quality dependent on the acceleration measurement and on the limit acceleration data, it is provided to trigger a prohibiting action of the continuation of the drilling operation as soon as one of the components AX or AY measured on the accelerometer (17, FIG. 1) exceeds the registered threshold limit SBX or SBY.

Figure 7:
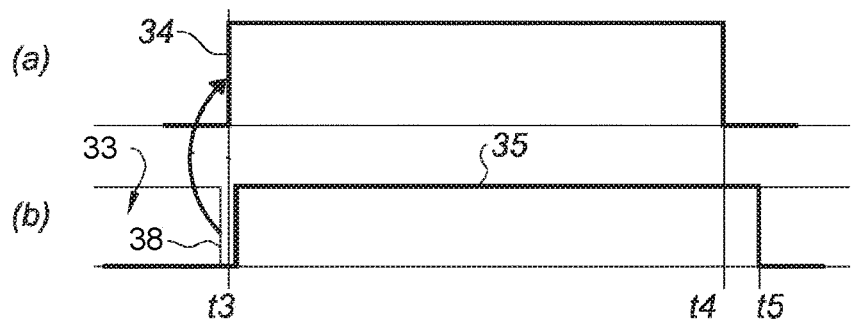
FIG. 7 is a timing diagram of signals generated during the controlling method in another form of the present disclosure.

In FIG. 7, a timing diagram of controlling signals of this third form of the controlling method of the present disclosure is represented. The signal (a) of FIG. 7 represents a temporal evolution of the activation signal or of the drilling authorization in a preprogrammed drilling position.

The signal (b) of FIG. 7 represents the evolution over time of the analysis of the measurement data of the accelerometer (17, FIG. 1). In a first portion 33, the stabilization condition CL was tested after the approach of the drilling tool according to the first or second forms of the controlling method of the present disclosure. When the test of the logical condition CL is favorable in 38, the signal (a) switches in 34 to give the drilling authorization and the test of the stabilization condition CL is completed. Immediately after this instant t3, in a second portion 35 of the signal (b), the logical condition of the drilling quality described using the FIG. 5 was tested.

If the logical condition of the drilling quality is correct, the corresponding data of good drilling quality are registered in the drilling traceability file in association with the drilling position 23.

If the logical condition of the drilling quality is incorrect, the signal (a) of drilling authorization falls to date t4 interrupting the drilling and the corresponding drilling defect data are registered in the drilling traceability file in association with the drilling position 23.

In one form, the supervision of the accelerometer is in all cases continued beyond drilling stop date t4 and extended till a date t5 preprogrammed to supervise the withdrawal of the drill 13.

Figure 8:
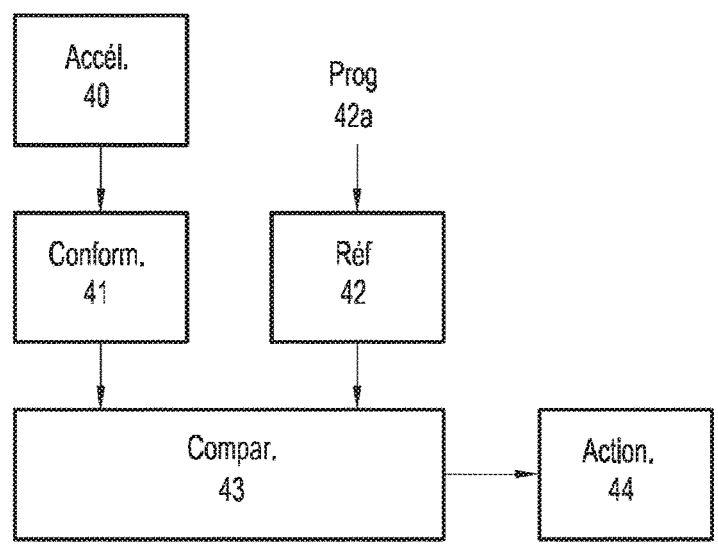
FIG. 8 is a block diagram of a controlling device of a driller robot of another form of the present disclosure.

In FIG. 8, a section of the calculator 10 of the drilling robot of the present disclosure is represented wherein the drilling method of the form described using FIGS. 6 and 7 is executed. The accelerometer 40 (similar to the accelerometer 17 of FIG. 1) is connected to a circuit 41 shaper of measurement signals of the instantaneous acceleration of the end of the mobile structure of the driller robot. By prior programming in 42a the registration of the limit acceleration tables SBX, SBY is realized, in the X and Y directions in a register 42.

The data of the register 42 and of the shaper 41 are then tested in a test comparator 43 which implements the logical condition of the drilling quality described using FIG. 7. Depending on the logical condition, an action module 44 executes a registering of the drilling quality data in the drilling traceability file in association with the drilling position 23 and, as the case may be, a stop of the drilling is generated.

What is claimed is:

1. A method for controlling a drilling robot including a driven mechanical structure allowing to place a drilling tool in a sequence of drillings programmed in terms of position and orientation of the drilling of a part, said method comprising:
   determining an acceleration of the drilling tool at an end of an approach on a drilling position;
   testing a stabilization condition of the drilling tool to establish a drilling authorization;
   determining the acceleration of the drilling tool at the end of the approach on the drilling position being continued after the drilling authorization so as to realize an analysis of measurement data of an accelerometer, then to exploit the analysis of the measurement data in real time in order to trigger on at least one of the drilling robot and the drilling tool a corrective action.

2. The controlling method according to claim 1, wherein one of measured components of the accelerometer is established according to an axis of a perforating drill, and the measurement of the components according to two other components of an acceleration vector are tested in a logical condition of drilling quality to detect a programmed drilling ovalization.

3. The method according to claim 2, wherein the logical condition of the drilling quality comprises comparison of the components of the measured acceleration at a limit acceleration table.

4. The method according to claim 2, wherein the test of the condition of stabilization includes the comparison of at least one value of instantaneous measurements of at least one component of the acceleration vector at a predetermined threshold value.

5. The method according to claim 1, wherein the analysis of measurement data is exploited offline by realizing a data file of acceleration measurements associated with each drilling position so as to provide traceability means of the drilling operation with reference to each programmed drilling position.

6. The method according to claim 1, wherein a logical condition of stabilization comprises the consideration of instantaneous measurements of at least one component of an acceleration vector.

7. The method according to claim 1, wherein the test of the stabilization condition of the drilling tool is combined with the progress of a preprogrammed period.

8. The method according to claim 1, wherein the corrective action is a cycle stop.

9. A drilling robot implementing the drilling controlling method according to claim 1, wherein the drilling robot comprises an accelerometer secured to an end of a mobilization structure of the drilling tool, the accelerometer being connected to measurement, monitoring and testing means of a logical condition of stabilization on a sequence of drilling positions preprogrammed in a memory associated with a control calculator of the drilling robot.

10. The drilling robot according to claim 9, wherein the accelerometer is secured to the end of a mobilization structure of a drilling tool so that a component of the measured acceleration is aligned with an axis of a perforating drill.

11. The drilling robot according to claim 9, wherein the drilling robot comprises means for registering drilling quality data, produced on the basis of the comparison of measurement data of the accelerometer at a table of comparison values, in a drilling traceability file in association with the drilling position.

* * * * *